(12) United States Patent
Brain

(10) Patent No.: US 9,549,101 B1
(45) Date of Patent: Jan. 17, 2017

(54) IMAGE CAPTURE ENHANCEMENT USING DYNAMIC CONTROL IMAGE

(71) Applicant: International Business Machines Corporation, Armonk, NY (US)

(72) Inventor: Alister J. Brain, Cambridge (GB)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/841,988

(22) Filed: Sep. 1, 2015

(51) Int. Cl.
H04N 5/217 (2011.01)
H04N 5/225 (2006.01)
H04N 7/18 (2006.01)
G06K 9/00 (2006.01)

(52) U.S. Cl.
CPC .......... H04N 5/217 (2013.01); G06K 9/00255 (2013.01); H04N 5/2256 (2013.01); H04N 7/181 (2013.01)

(58) Field of Classification Search
CPC ...... H04N 5/217; H04N 5/2256; H04N 5/225; H04N 5/222; H04N 5/232335; H04N 5/33; H04N 5/332; H04N 7/18; H04N 7/181; H04N 13/0253; G08B 13/196; G01D 5/39; G06K 9/00255; G06K 9/0063; G06K 9/3241; G06K 9/6202; G06K 9/46; G06K 9/00; G06K 9/00201; G06K 9/00375; G06K 9/3233; G06K 9/2027; G06T 2207/10012; G06T 2207/30212; G06T 15/00; G06T 15/10; G06T 15/20; G06T 7/0073; G06T 7/0081; G06T 7/2006; G06T 7/004; G06T 7/0097; G06T 2200/04; G06T 2200/20144; G06T 3/60; G06T 3/20; G06F 3/017; G06F 3/0304; G03B 17/00

USPC ......................................................... 348/241
See application file for complete search history.

(56) References Cited

U.S. PATENT DOCUMENTS 5,574,511 A * 11/1996 Yang ..................... H04N 5/272
348/586
7,174,033 B2 2/2007 Yukhin et al.
7,806,604 B2 10/2010 Bazakos et al.
8,180,114 B2 * 5/2012 Nishihara ............... G06F 3/017
382/103

(Continued)

FOREIGN PATENT DOCUMENTS

WO 2014018836 A1 1/2014

OTHER PUBLICATIONS

Brain; U.S. Appl. No. 15/214,073, filed Jul. 19, 2016; Entitled "Image Capture Enhancement Using Dynamic Control Image".

(Continued)

Primary Examiner — Pritham Prabhakher
(74) Attorney, Agent, or Firm — Alexa L. Ashworth

(57) ABSTRACT

Embodiments of the present invention provide systems and methods for image capture with infrared emitters, with associated computer control and processing for providing consistent and high quality image data. Image data of consecutive frames from a camera is obtained, with a first frame being taken during an emission of infrared light directed at a scene to be captured by the camera and a second frame being taken without an emission of infrared light. The consecutive frames provide a dynamic control image of the captured scene. The image data may be used to support photometric sampling techniques used in building geometric models for subject recognition in camera imagery in variable lighting environments.

12 Claims, 6 Drawing Sheets

(56) References Cited

U.S. PATENT DOCUMENTS

| | | | |
|---|---|---|---|
| 8,693,731 B2 | 4/2014 | Holz et al. | |
| 9,025,023 B2* | 5/2015 | Park | G06K 9/00221 |
| | | | 348/135 |
| 9,129,400 B1* | 9/2015 | Ivanchenko | G06T 7/2053 |
| 9,285,893 B2* | 3/2016 | Holz | G06K 9/00375 |
| 9,342,189 B2* | 5/2016 | Kuboyama | G06F 3/0425 |
| 9,360,283 B1* | 6/2016 | Tejada | F41G 3/2605 |
| 9,377,863 B2* | 6/2016 | Bychkov | G06F 3/017 |
| 2005/0012817 A1* | 1/2005 | Hampapur | H04N 7/185 |
| | | | 348/143 |
| 2009/0103780 A1* | 4/2009 | Nishihara | G06F 3/017 |
| | | | 382/103 |
| 2010/0177929 A1* | 7/2010 | Kurtz | G06K 9/00228 |
| | | | 382/103 |
| 2011/0150300 A1 | 6/2011 | Lee et al. | |
| 2014/0320486 A1 | 10/2014 | Haanpaa et al. | |
| 2015/0297949 A1* | 10/2015 | Aman | G06T 7/2033 |
| | | | 348/157 |
| 2016/0100166 A1* | 4/2016 | Dragne | H04N 19/124 |
| | | | 375/240.03 |

OTHER PUBLICATIONS

List of IBM Patents or Patent Applications Treated As Related; Dated Jul. 19, 2016; 2 pages.

Chen et al., "Experimental Analysis of Face Recognition on Still and CCTV images", IEEE Fifth International Conference on Advanced Video and Signal Based Surveillance, 2008, pp. 317-324, <http://conradsanderson.id.au/pdfs/chen_avss_2008.pdf>.

Rout, Rupesh Kumar, "A Survey on Object Detection and Tracking Algorithms", Computer Science and Engineering of National Institute of Technology Rourkela, Thesis submitted Jun. 2013, 75 pages, <http://ethesis.nitrkl.ac.in/4836/1/211CS1049.pdf>.

Woodham, Robert J., "Gradient and Curvature from Photometric Stereo Including Local Condence Estimation", Journal of the Optical Society of America, 1994, 39 pages, <https://www.cs.ubc.ca/~woodham/papers/Woodham94a-preprint.pdf>.

* cited by examiner

IMAGE CAPTURE ENHANCEMENT USING DYNAMIC CONTROL IMAGE

BACKGROUND OF THE INVENTION

The present invention relates generally to the field of image capture, and more particularly to an image capture enhancement system using a dynamic control image.

Closed-circuit television (CCTV) is the use of one or multiple video cameras to provide surveillance or monitoring of an area within the view of the one or more video cameras. The CCTV cameras may be static, in a fixed position, or they may be dynamic with movement to pan, tilt, or zoom to provide more information on an area. The images received from CCTV cameras may be analyzed to detect and identify or recognize objects, including people. Photometric sampling techniques are known to be used in building geometric models for subject recognition in CCTV imagery.

Performing subject, and in particular facial, recognition on CCTV sources of images can be greatly enhanced by taking into account the physical geometry of the subject being identified. This information is, however, not usually directly available unless using highly specialized and expensive 3D scanning devices. Typically, in the field of facial recognition, subject geometry is estimated in software using lighting compensation models and shadow detection to estimate the orientation or pose of the subject. These techniques may suffer proportionally with variation in lighting conditions and in lower light environments such as underground stations.

The significance of lighting conditions for facial recognition is important. To perform high quality facial recognition a number of fiducial markers must be determined in order to encode the face for searching; markers such as the corners of the eyes, pupils, lips, nose, and many other more subtle points. In a controlled environment, such as an airport border control desk, the lighting is consistent, the light and subject face each other directly, removing shadows. In this situation, although 3D surface models are generated to account for subtle tilt and rotation, the surface detail is more important and accurate for determining the fiducial markers.

SUMMARY

According to one embodiment of the present invention, a method for image capture enhancement is provided, the method comprising: activating a sequence of infrared emissions, by one or more emitters in an environment space monitored by a camera for capturing images of the environment space, wherein the sequence of infrared emissions is synchronized with a frame counter of the camera; receiving captured image frames from the camera, wherein the captured image frames comprise a first frame captured during an emission, and a second frame, adjacent to the first frame, captured outside the emission; subtracting the second frame from the first frame to provide an image of a reflected infrared component; removing, from the reflected infrared component, a previously obtained background image of the environment space to enhance a subject in the image; and outputting a resultant image for processing.

According to another embodiment of the present invention, a computer program product for image capture enhancement is provided, the computer program product comprising: a computer readable storage medium having program instructions stored on the computer readable storage medium, the program instructions executable by a processor to cause the processor to: activate a sequence of infrared emissions, by one or more emitters in an environment space monitored by a camera for capturing images of the environment space, wherein the sequence of infrared emissions is synchronized with a frame counter of the camera; receive captured image frames from the camera, wherein the captured image frames comprise a first frame captured during an emission, and a second frame, adjacent to the first frame, captured outside an emission; subtract the second frame from the first frame to provide an image of a reflected infrared component; remove, from the reflected infrared component, a previously obtained background image of the environment space to enhance a subject in the image; and output a resultant image.

According to another embodiment of the present invention, a system for image capture enhancement is provided, the system comprising: one or more computer processors; one or more computer readable storage media; program instructions stored on the one or more computer readable storage media for execution by at least one of the one or more processors; one or more infrared emitters capable of being positioned to emit infrared light on an environment space monitored by a camera capable of capturing images of the environment space; a control system using a processor and a memory configured to provide instructions to the processor to execute control of a sequence of emissions by the one or more emitters, wherein a sequence of infrared emissions is synchronized with a frame counter of a camera; and a processing system using a processor and a memory configured to provide instructions to the processor to execute processing of captured image frames of the camera, the processing system including: a frame receiving component configured to receive the captured image frames comprising a first frame captured during an emission, and a second frame, adjacent to the first frame, captured outside an emission; an adjacent frame processing component configured to subtract the second frame from the first frame to provide an image of a reflected infrared component; a background deduction component configured to remove, from the reflected infrared component, a previously obtained background image of the environment space to enhance a subject in the image; and a resultant image output component configured to output a resultant image.

DETAILED DESCRIPTION

Figure 1:
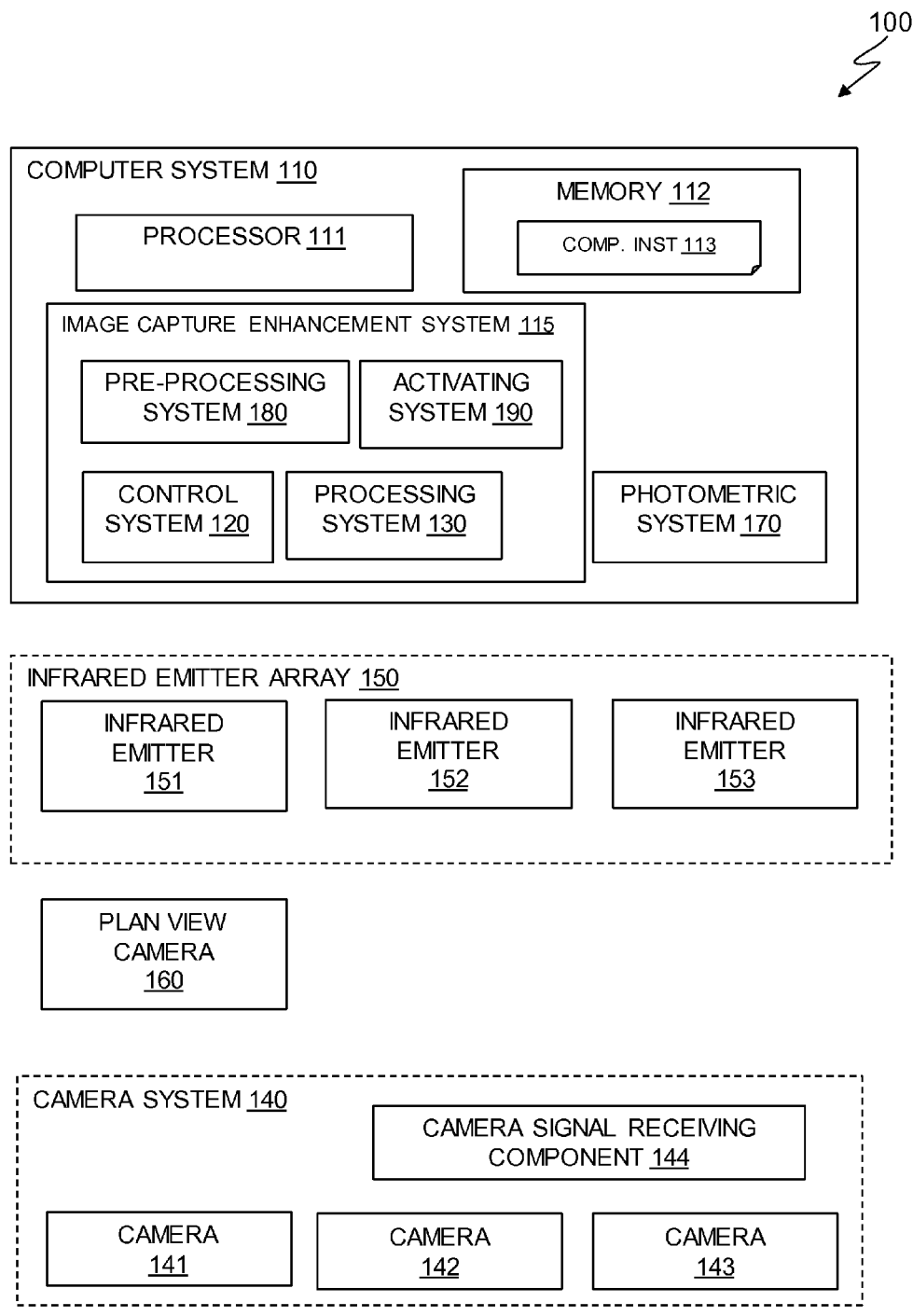
FIG. 1 depicts a block diagram illustrating a system, in accordance with at least one embodiment of the invention.

An image capture system with infrared emitters is described with associated computer control and processing for providing consistent and high quality image data. Image data of consecutive frames from a camera is obtained, with a first frame being taken during an emission of infrared light directed at a scene to be captured by the camera and a second frame being taken without an emission of infrared light. The consecutive frames provide a dynamic control image of the captured scene. The image data may be used to support photometric sampling techniques used in building geometric models for subject recognition in camera imagery in variable lighting environments.

During image capture, poor or changeable lighting makes it hard or impossible to distinguish facial features from dynamic shadows or other lighting effects. In a consistent lighting environment, an initial calibration phase is sufficient to offer a control model due to known conditions. In poorly or dynamically lit environments, no such control model can exist. The disclosure describes a mechanism for calculating this dynamically.

In this exemplary embodiment, adjacent or consecutive images from a camera feed are taken with one image acting as a control image and, the other, a source image to be analyzed for features. Emitters are provided in synchronization with a camera frame rate such that an infrared emission takes place for substantially a single frame of capture. Without an emission of infrared light, two consecutive frame images would have practically identical lighting and offer no control from which the dynamic lighting can be determined and eliminated.

Each of the synchronized emitters may flash ON for a first image and are OFF for a second image. The normally lit source image is subtracted from the additionally lit control image leaving only the difference. This difference is a component only from a known light source, at a known time, at a known intensity, and at a known camera angle. This along with the known camera position is sufficient to calculate the lighting normals of the subject, using existing photometric sampling techniques.

In this exemplary embodiment, infrared emitters are used, which emit a short emission of infrared light. Substantially non-visible light is used because it is invisible to the human eye and so does not result in the environment being filled with flashing visible light.

A subject may be a person or other object to be identified. Identification of individuals by surveillance cameras is an important field for security and policing. However, the described method and system may be applied to monitoring and identification of other objects, such as vehicles, etc.

The system may be provided as a retro-fit system and method for an existing camera system, such as a CCTV system. Alternatively, it may be provided using other dedicated camera arrangements. The term CCTV system is used in some of the described embodiments; however, this may be a system of one or more cameras which are not provided by a conventional CCTV system. For example, drone cameras may form a moving surveillance system.

In embodiments of the present invention, the cameras may be video cameras with a standard frame rate, for example, in the range of approximately 10 to 60 frames per second. Alternatively, the cameras may take a series of frames of stationary images.

The system and method may use the existence of a static camera system or a dynamic camera system for which telemetry is available.

A dynamic camera system may include a fixed position camera with camera motion, such as pan, tilt, and/or zoom. In a dynamic system where cameras are in a fixed position but have pan, tilt and/or zoom capability, the additional telemetry of the camera angle and zoom level would be captured with each frame and used to compute the camera's view frustum (orientation and field of view) within a virtual model of the scene.

In a dynamic system where the camera itself is mobile, such as vehicle mounted, body worn, or part of a mobile device, the attitude of the mobile system will not remain constant and so the configuration step applicable for a fixed position camera would not apply. A mobile camera system may provide accurate and low latency absolute attitude telemetry, such as that provided by readily available gyroscopic or magnetic flux sensors. The attitude telemetry may be relative with the addition of the camera angle telemetry as for the fixed camera system above.

To take advantage of the timed emitters, positional telemetry may also be provided to position the camera within a virtual model of the scene. This is obtained via an alternate positioning system.

Note that both cameras and emitters may be mobile and may both require attitude and positional telemetry. For example, in the case of drone mounted sensors in collaborative or swarm configurations.

The camera system may include one or more cameras covering a monitored environment or area, which transmit their signals to a receiving processor or monitor. In the described system, the camera systems do not include infrared cut-off filters, as the images need to include infrared light for processing.

Additional hardware components are provided in the form an array of infrared emitters. In one embodiment, the emitters may be infrared light emitting diode (LED) transmitters or diffused light emitters from infrared laser diodes. The emitters may be provided in fixed positions around the monitored environment. Infrared emitters are simple, cheap, readily available, and provide good penetration in high particulate environments.

For human subjects, wavelengths between 850 nm-1100 nm and even higher will work safely. With wavelengths of 850 nm a gentle red glow is perceivable but this will not be strong enough to visibly light the scene (causing unwanted strobing) or significantly detracting from the performance of the system. The optimal range is approximately 900 nm-1100 nm as this is where most CCTV cameras are most sensitive to infrared light, offering optimal contrast between infrared lit and unlit frames. High intensity 940 nm wavelength LEDs are now mass produced and would be a good choice for the emitters.

The ON-OFF switching cycle of the emitters is required to provide a fast response and the emitters are required to have a long lifespan under switching conditions. Responsive switching allows captured frames to be closer in time, providing a closer pair of comparative frames and thus a higher quality result.

The array of infrared emitters may be placed above head-height around the periphery of the monitored environment. The infrared emitters are computer controlled to each emit a flash of infrared light, in sequence, given a timing signal. The sequence may coincide with a frame rate of a capturing camera.

In one embodiment, the emitters are part of a camera system, for example as part of a CCTV system with each CCTV camera in a multi-camera system having an infrared LED emitter. In each multi-camera zone, one of the emitters is OFF at any one time, the rest being ON provide ambient infrared lighting for normal operation. The CCTV system itself may send the emitter timing signal and each CCTV camera's infrared emitter may take it in turns to flash ON then OFF, providing the image pairs described above for feature extraction.

In an alternative embodiment, the infrared emitters may be provided separately to the camera system. The system may be provided at a relatively low-cost and may be retro-fitted into existing monitored environments.

A further additional hardware component may be provided in the form of at least one over-head, wide-angled plan view camera disposed above the monitored environment. The position of the infrared emitters above head-height may ensure a highest point of a subject is illuminated for capture by the plan view camera. The plan view camera may be synchronized to the infrared emission.

An image capture enhancing system is provided including a control system and a processing system having computer software, which regulates and emits the timing signal for the infrared emitters and processes the captured imagery to produce three dimensional "normal" data which locates and orients the subject in three dimensional space.

The system may provide high-quality data for geometric model building in low and variable light environments.

The present invention will now be described in detail with reference to the Figures. FIG. 1 depicts a block diagram illustrating a system, generally designated 100, in accordance with an embodiment of the present invention. Modifications to system 100 may be made by those skilled in the art without departing from the scope of the invention as recited by the claims. In an exemplary embodiment, system 100 includes computer system 110, infrared emitter array 150, plan view camera 160, and camera system 140.

Computer system 110 includes at least one processor 111, a hardware module, or a circuit for executing the functions of the described image capture enhancement system 115 including pre-processing system 180, activating system 190, control system 120, and processing system 130. Memory 112 may be configured to provide computer instructions 113 to the at least one processor 111 to carry out the functionality of the systems. Computer system 110 may include, or may be in communication with, a photometric system 170 for further processing and identification of subjects from the enhanced images.

Pre-processing system 180 may calibrate and provide a background image for a monitored environment to be used by the processing system 130.

In this exemplary embodiment, activating system 190 activates control system 120 when a subject is detected in the monitored environment. For example, there may be motion detectors in the environment or the activation may be triggered by camera system 140.

Control system 120 may emit a control signal to infrared emitters 151-153 at regular intervals, which is synchronized with a video or image recording frame counter of camera system 140. The control signals may activate each of the infrared emitters 151-153 in turn in a sequence. The interval and duration of the emissions can be tuned to provide the desired frame rates and capture characteristics. Control system 120 may also synchronize the plan view camera to record frames at the times of the infrared emissions.

In this exemplary embodiment, processing system 130 processes the captured images of the cameras 141-143.

Image capture enhancement system 115 may be in communication with camera system 140, which includes one or more cameras 141-143 and a camera signal receiving component 144. Image frames may be captured from one or more of the cameras 141-143 and may be processed in real-time, or batch processed in retrospect, given good synchronization data. Camera system 140 may be an existing CCTV system, or may be provided as part of image capture enhancement system 115. Various forms of cameras 141-143 may be used in the described system, including non-video frame producing cameras. A virtual model of the monitored environment may be generated from the captured images including data relating to the captured subject.

System 100 may include infrared emitter array 150 of non-visual electromagnetic emitters. In this exemplary embodiment, infrared emitters 151-153 are used, which may be, for example, LED transmitters. Infrared emitters 151-153 are in wireless or wired communication with control system 120 to receive a timing signal, including a frequency and duration of the infrared emission of each of infrared emitters 151-153.

In this exemplary embodiment, system 100 may include plan view camera 160, in communication with control system 120 and processing system 130.

Figure 2:
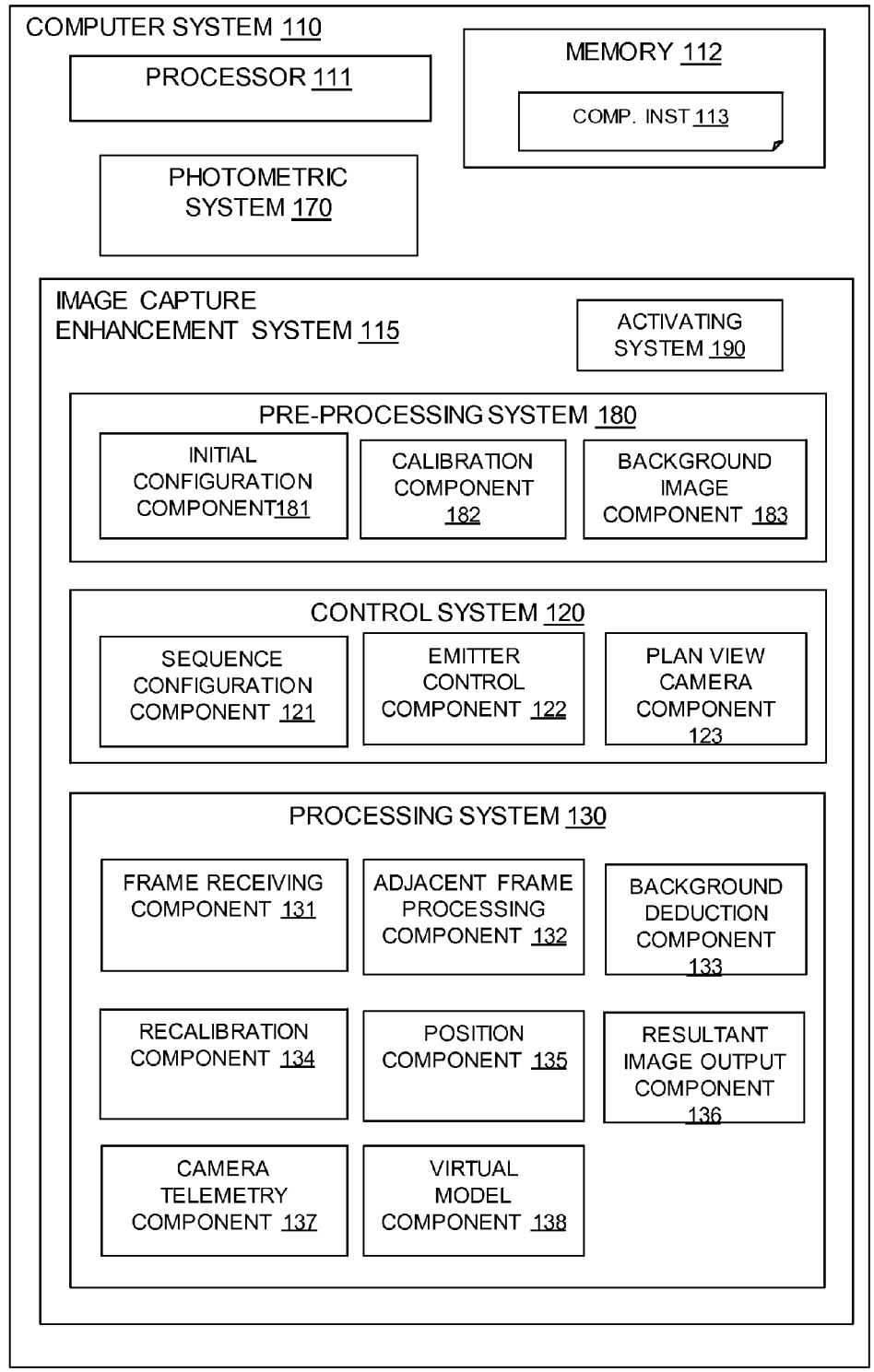
FIG. 2 depicts a block diagram illustrating further details of a computer system, in accordance with an embodiment of the present invention.

FIG. 2 depicts a block diagram illustrating further details of computer system 110 of FIG. 1, in accordance with an embodiment of the present invention.

Computer system 110 may include at least one processor 111, a hardware module, or a circuit for executing the functions of the described components, which may be software units executing on the at least one processor. Multiple processors running parallel processing threads may be provided enabling parallel processing of some or all of the functions of the components. Memory 112 may be configured to provide computer instructions 113 to the at least one processor 111 to carry out the functionality of the components.

Computer system 110 may include an image capture enhancement system 115, including a pre-processing system 180 for setting up configurations for the monitored environment. Pre-processing system 180 may include an initial configuration component 181 for measuring and recording the position and orientation of the CCTV cameras. Pre-processing system 180 may include a calibration component 182 for creating a zone-map of the infrared intensity from the infrared emitters within the monitored area. Pre-processing system 180 may also include a background image component 183 for generating a background image for each CCTV camera by taking images using the infrared emission sequence with no subjects in the monitored environment.

The image capture enhancement system 115 may include an activating system 190 for activating control system 120 when a subject is detected in the monitored environment.

Image capture enhancement system 115 may include control system 120 for controlling the sequence of the infrared emitter array 150 and, optionally, controlling the plan view camera 160. Control system 120 may include a sequence configuration component 121 for setting a sequence for emission of infrared by the infrared emitters 151-153. The sequence may be coordinated to the available CCTV cameras and their frame timing. Control system 120 may include an emitter control component 122 for controlling the infrared emitters 151-153 and providing the sequence. The control system 120 may also include a plan view camera component 123 for activating the plan view camera 160 within the sequence.

Image capture enhancement system 115 may also include processing system 130 for processing and enhancing the captured video recordings to produce enhanced images.

Processing system 130 may include the following components. A frame receiving component 131 may receive instances of adjacent frames from a CCTV camera for processing. A camera telemetry component 137 may provide camera telemetry data for a non-static camera at each captured frame. A virtual model component 138 may build a virtual model of the scene. An adjacent frame processing component 132 may process adjacent first and second frames wherein the first frame is captured with an infrared light emission and the second frame is captured without an infrared light emission, to result in just the infrared component of the frame image when the frames are combined. A background deduction component 133 may deduct the background image obtained by the background image component 183 of the pre-processing system 180 to result in just the subject in the image. A position component 135 may calculate a position of a subject based on an image by the plan view camera 160. A recalibration component 134 may recalibrate the infrared based on the position of the subject within the monitored environment based on the zone-map generated by the calibration component 182 of the pre-processing system 180. A resultant image output component 136 may output a series of enhanced images of the subject.

Computer system 110 may include, or may be in communication with, a photometric system 170 for further processing and identification of subjects from the enhanced images.

Figure 3:
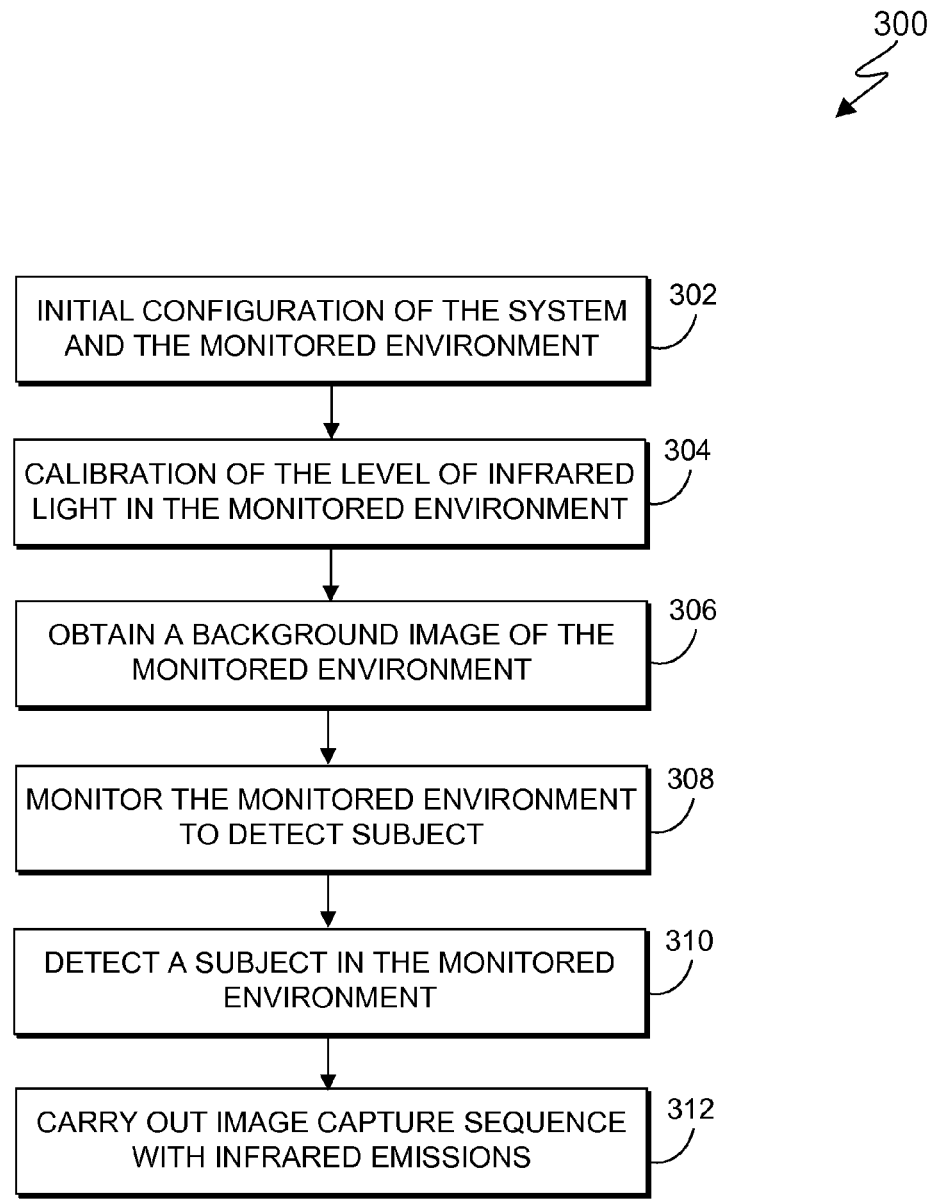
FIG. 3 depicts a flowchart illustrating operational steps for the initial configuration and calibration of a system, in accordance with an embodiment of the present invention.

Referring to FIG. 3, a flowchart 300 depicts operational steps for the initial configuration and calibration of system 100, in accordance with an embodiment of the present invention.

In step 302, initial configuration of a system and a monitored environment, including determining and measuring the layout of the system, is performed. In this exemplary embodiment, a static CCTV camera set-up (i.e., static cameras with no pan/tilt/zoom) is implemented, in which the position and orientation of each camera is measured and recorded in the software. In other embodiments, a dynamic camera set-up is implemented, in which the position and attitude telemetry may be configured within a model of the monitored environment, and may be updated during the image capture.

In step 304, calibration of the level of infrared light in the monitored environment is performed. Calibrating the system may include calibrating at least one camera 141-143 and infrared emitters 151-153. In this exemplary embodiment, the calibration measures the level of infrared light detected in zones of the monitored environment that may be added to the virtual model. For example, the area to be monitored may be divided into zones as shown and described in relation to FIG. 4 below. The calibration step may be performed to measure the level of infrared light detected in each zone, from each of infrared emitters 151-153 as they activate in turn. In one embodiment, this calibration may be done by placing a white sphere of known radius in a zone and running the emission sequence. A sphere of known size is used to ensure that the surface area and thus, intensity measurements, of reflected infrared light remain consistent over all distances and orientations. The resulting 'zone-map' is used, in normal operation, to recalibrate the intensity of the reflected infrared light.

In step 306, a background image of the monitored environment is obtained. In this exemplary embodiment, the light emitting sequence is run in an empty environment (i.e., an environment without one or more subjects present). This allows background geometries to be removed from the data when in normal operation, isolating the subjects from the environmental background. In some embodiments, in operation, the method may reference a virtual model, including a light calibration model of the monitored environment and the background image.

In step 308, the camera system monitors the environment, in order to detect a subject who enters the monitored environment.

In step 310, in response to detecting that a subject has entered the monitored environment, an image capture sequence is triggered, with the at least one camera recording image frames of the subject, while a sequence of infrared emissions are triggered. As discussed, the sequence of ON/OFF infrared emissions provide infrared light towards a subject in the monitored environment to obtain consecutive image frames, one as a control frame and one as a source frame. The cameras 141-143 and infrared emitters 151-153 may be arranged such that different angles of the subject are captured.

In step 312, the image capture sequence with infrared emissions sequence is carried out. This step is described in further detail with respect to the operational steps of FIG. 3.

Figure 4:
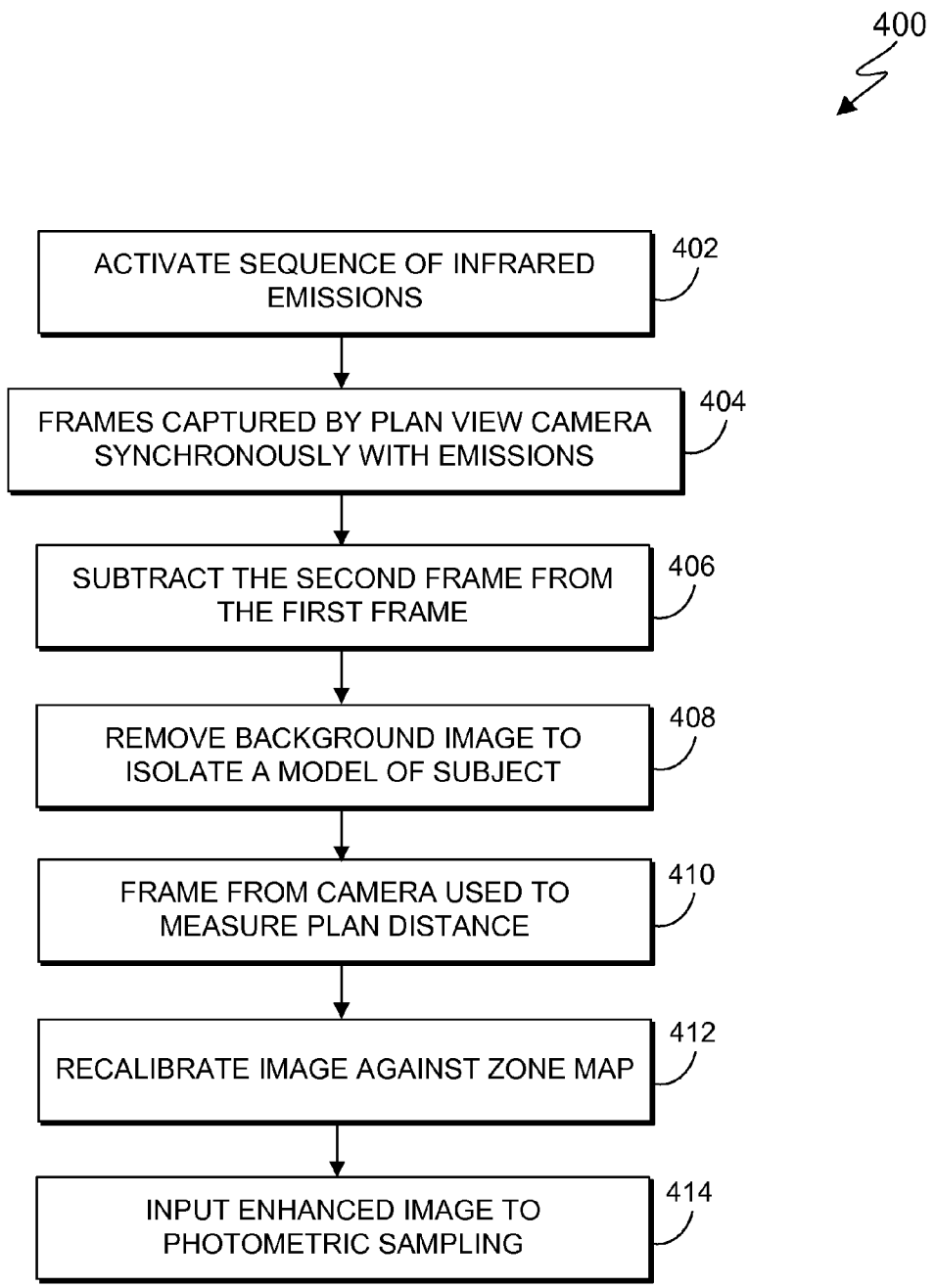
FIG. 4 depicts a flowchart illustrating operational steps for an image capture sequence and processing of the captured images, in accordance with an embodiment of the present invention.

FIG. 4 depicts flowchart 400 illustrating operational steps for an image capture sequence and processing of the captured images, in accordance with an embodiment of the present invention.

In step 402, control system 120 may activate a sequence of infrared emissions during a period of image or video capture, resulting in recorded image frames. In some embodiments, the emission sequence is pre-defined. For example, the emission sequence may be in any defined order, and may allow for multiple infrared emitters 151-153 being activated at once. However, infrared emitters with overlapping fields of emission may not be activated simultaneously, as a single source of infrared light is required to make the appropriate calculations. In this exemplary embodiment, infrared emitters 151-153 are positioned in such a manner so as to avoid strong reflection from background surfaces, which may generate false readings.

In this exemplary embodiment, the frame rates are customizable, as part of the configuration phase (i.e., steps of FIG. 3). For example, the system's cameras may have varying frame rates, or may have environmental conditions in each zone or for each camera which differ sufficiently, so as to trigger a 'tuning' of each of the infrared emitter's timing and durations for the best resulting frame captures. In some embodiments, a default is used, which matches (i) the camera system's capture frame rate and (ii) aligns the emitter-on timing with the start of a capture, and the emitter-off timing just prior to the start of the next capture.

Primary variables for infrared emitter timing may be relative to a synchronization signal (SYNC) covering the period of a pair of frames for each camera, and measured in milliseconds. For example: for a video capture frame rate of 50 fps, 50 synchronization signals per second would be needed, which is every 20 ms (i.e., 1000 ms/50 fps=20 ms). Table 1, below, shows an example of the synchronization signals needed over a period of time for a pair of frames, according to the above example.

TABLE 1

| Time | Event |
| --- | --- |
| 0 ms | SYNC; Emitter ON; Capture Frame 1 |
| 20 ms | SYNC; Emitter OFF; Capture Frame 2 |
| 40 ms | SYNC; Emitter ON; Capture Frame 1 |
| 60 ms | SYNC; Emitter OFF; Capture Frame 2 |

In step 404, frames from the plan view camera may be captured synchronously with the infrared emissions for positioning of the subject, as described further below. In this exemplary embodiment, the telemetry of a camera is also captured if the camera can move, including camera position and/or camera orientation. The telemetry may be captured for each frame and used to configure the camera's view within the virtual model of the monitored environment. In this exemplary embodiment, the recorded video frames include multiple instances of a first frame with infrared emission, and a second frame, adjacent to the first frame, without infrared emission.

In step 406, the instances of the recorded image frames of the image or video capture may be processed by subtracting the second frame (i.e., frame without infrared emission) from the first frame (i.e., frame with infrared emission) to provide an image of only the reflected infrared component.

In step 408, Further processing may be carried out by removing an image of the background image from the reflected infrared component, to isolate a model of the subject for the instance.

In step 410, a frame from the plan view camera, that was taken synchronously with an infrared emission in step 402, is used to identify the locations of all subjects in two dimensions, in a plan view. In this exemplary embodiment, the distance of all subjects may be measured using the intersection of the camera and the plan view camera infrared views.

In step 412, the camera's infrared resultant image, for a particular instance, is recalibrated against the zone-map to produce consistent measurements of infrared reflections from the subjects only.

In step 414, the enhanced image is input into photometric sampling. In this exemplary embodiment, the result is an enhanced captured image that isolates the subjects and provides an accurate and consistent lighting model for input into existing photometric sampling functions of facial recognition solutions.

In this exemplary embodiment, the intensity of the reflected and recalibrated infrared light, and the known angle between each emitter's emission center and each camera's field of view center are used to compute the 'normal' of the surfaces being reflected. Multiple frames from multiple cameras may be combined to accurately position and build a more complete composite geometric model of the object.

In order to recover the geometry or 'normal-map' of the subject, the angle of reflection of the infrared light is first calculated. This means positioning the subject in three dimensional space. A normal-map is a vector field, which indicates the direction of the face of a surface model. The vector field allows a calculation of how light would reflect off a surface. In some embodiments, the method samples the surface lighting to reverse engineer the normal-map in order to construct a three dimensional model of an object. In one embodiment, sequences of images taken at different times may be used for photometric sampling.

In this exemplary embodiment, established techniques for photometric sampling are used on the images. This technique is most often used in the context of more detailed three dimensional scanning in controlled environments, but becomes applicable here due to the predictable lighting conditions and subject isolation provided by the invention. In some embodiments, the use of infrared or other, non-visible light, to illuminate a scene avoids dazzling the subjects being recorded.

In this exemplary embodiment, synchronization of an infrared flash with one or more cameras is used, followed by the subtraction of a second image in the sequence from a first image to create a "difference" image that shows only the infrared illumination caused by the infrared flash. It is this difference image that is important when performing three dimensional feature recognition with accuracy.

Figure 5:
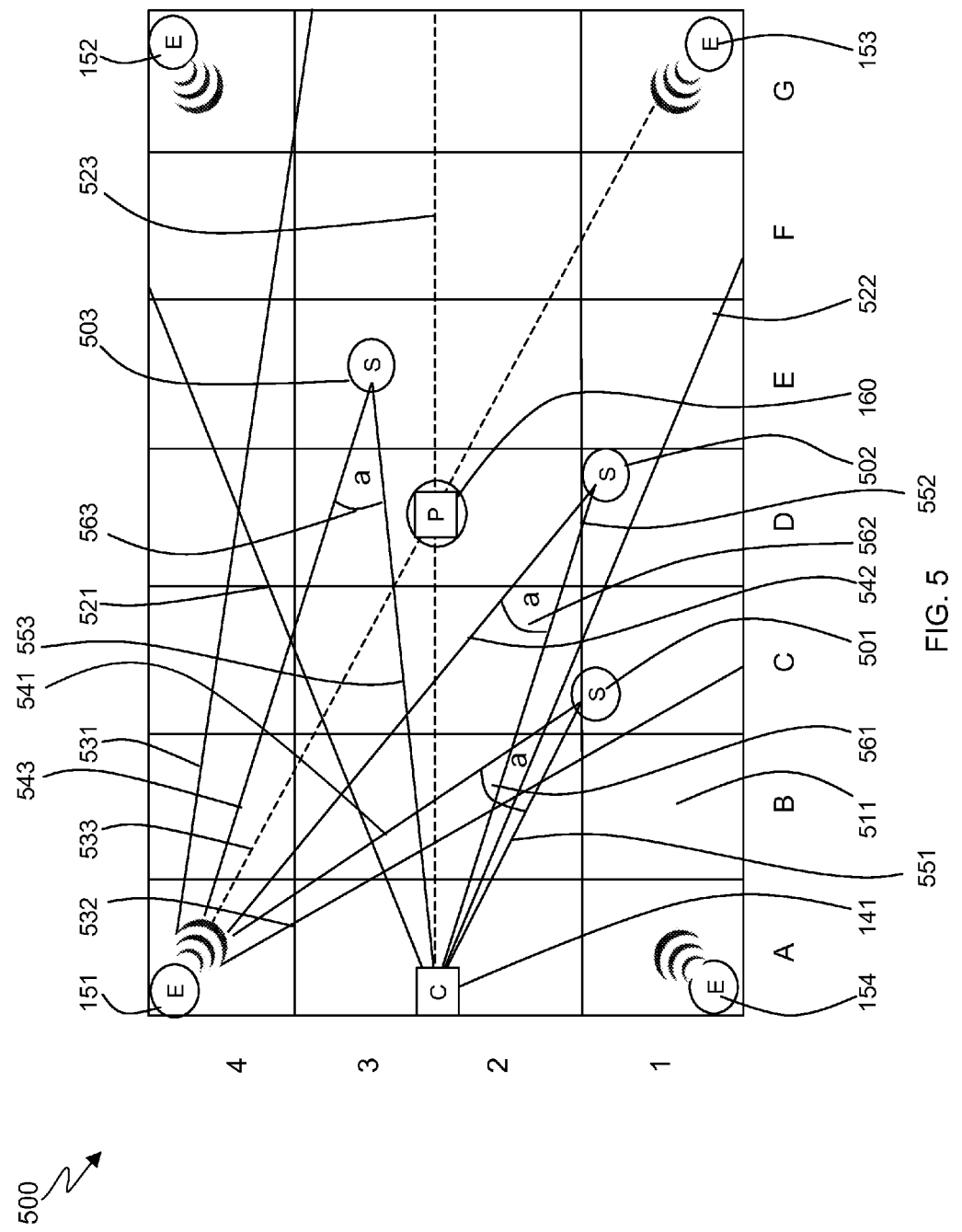
FIG. 5 depicts a schematic diagram of a system, in accordance with an embodiment of the present invention.

FIG. 5 depicts a schematic diagram 500 of a system, in accordance with an embodiment of the present invention.

Schematic diagram 500 shows a plan view of an area of the monitored environment. The area is divided into zones, shown as zones A1 to G4 (i.e., box A1 is one zone, box B1 is another zone, etc.). A camera 141 is shown on one side of the area. At each corner of the area at the periphery, four infrared emitters 151-154 are shown. This is an example arrangement of the camera 141 and infrared emitters 151-154, and many different variations in number and position may be envisaged. In some embodiments, a plan view camera 160 may be provided directed downwards onto the area.

The area shown in FIG. 5 may be calibrated prior to use to measure the level of infrared light detected in each zone, from each of the infrared emitters 151-154 as they activate in turn to create a zone-map for use in the processing. This may be carried out by placing a white sphere of known radius in each zone and running the emission sequence. The sphere of known size is used to ensure that the surface area, and thus intensity of measurements of reflected infrared light, remain consistent over all distances and orientations. This may be used to recalibrate the intensity of the reflected infrared light in each zone.

The area shown in FIG. 5 may be captured before any subjects have entered the area by running the emission sequence to obtain background images for reference in the processing.

FIG. 5 depicts an exemplary embodiment, in which three subjects 501, 502, and 503 are in the monitored environment. The camera 141 may have a view field shown by lines 521 and 522, with a center line 523. An infrared emitter 151 may have an emission field shown by lines 531 and 532, with an emission center line 533.

In a frame of capture of the camera 141 shown at the instance of FIG. 5, an infrared light emission from infrared emitter 151 illuminates the three subjects 501, 502, and 503 as shown by rays 541, 542, and 543, respectively. Rays 541, 542, and 543 are reflected by the subjects 501, 502, and 503, and the reflected rays 451, 452, 453 are captured by the CCTV camera 141. The angles 461, 462, 463 of refection of the rays are shown.

In a next frame of capture of the camera 141, the infrared emitter 151 does not illuminate the subjects 501, 502, and 503 and their image is captured without the infrared component. This second frame image may be subtracted from the first frame image in the processing to result in just the infrared image component. The resultant images may be processed by comparing them to the obtained background images, and may be recalibrated based on the infrared light zone-map.

At the same instance as the frame of capture of the CCTV camera 141 with the infrared emission, the plan view camera 160 may also capture the illuminated image. The image of the plan view camera 160 may be used to determine the two dimensional distances from the CCTV camera 141 and each of the subjects 501, 502, and 503, to increase the accuracy of the processing.

At a next stage in the sequence of emission, infrared emitter 154 may emit a flash of infrared light and this may illuminate a different aspect of the subjects 501, 502, and 503, which may be captured by the CCTV camera 141. Further stages may include emissions by infrared emitters 152 and 153. In this way, various angles of an image may be obtained and processed.

Identifying shadow detail and distinguishing it from facial texture detail enables better facial recognition. The timed infrared emitters are used to allow two images to be take in quick succession, one with infrared illumination (i.e., pseudo controlled lighting conditions) and one without (i.e., uncontrolled). Once aligned, the difference between these two images provides the shadow detail required to inform the three dimensional model, its detail, and its orientation.

Constantly lighting a scene, such as with CCTV constant infrared illumination, will not actually be consistent unless it is the only illumination in the scene. For example, other variable visible light and its usually accompanying variable infrared wavelengths, such as a shaft of sun, or a flickering incandescent light-bulb, will make the scene inconsistently lit and will only be offset by the consistent bath of infrared light from the CCTV system.

Having background constant CCTV infrared illumination in a monitored environment does not interfere with the operation of the described method and system as the image pairs when compared, removing all common features, including the CCTV lighting.

In poor or inconsistently lit environments, such as underground stations, where the camera systems are multiple or existing, and/or where the subject is uncontrolled (i.e., can be facing in any direction), the use of the described method improves the accuracy of facial encoding.

The challenge with less controlled environments is that there is not often a good reference image of any one person, under controlled lighting conditions encoded into a database. This is especially true in busy public areas such as railway stations and stadiums. In processing a face to encode it, one is attempting to generate as high a quality set of reference images as possible such that subsequent matches are as accurate as possible.

Figure 6:
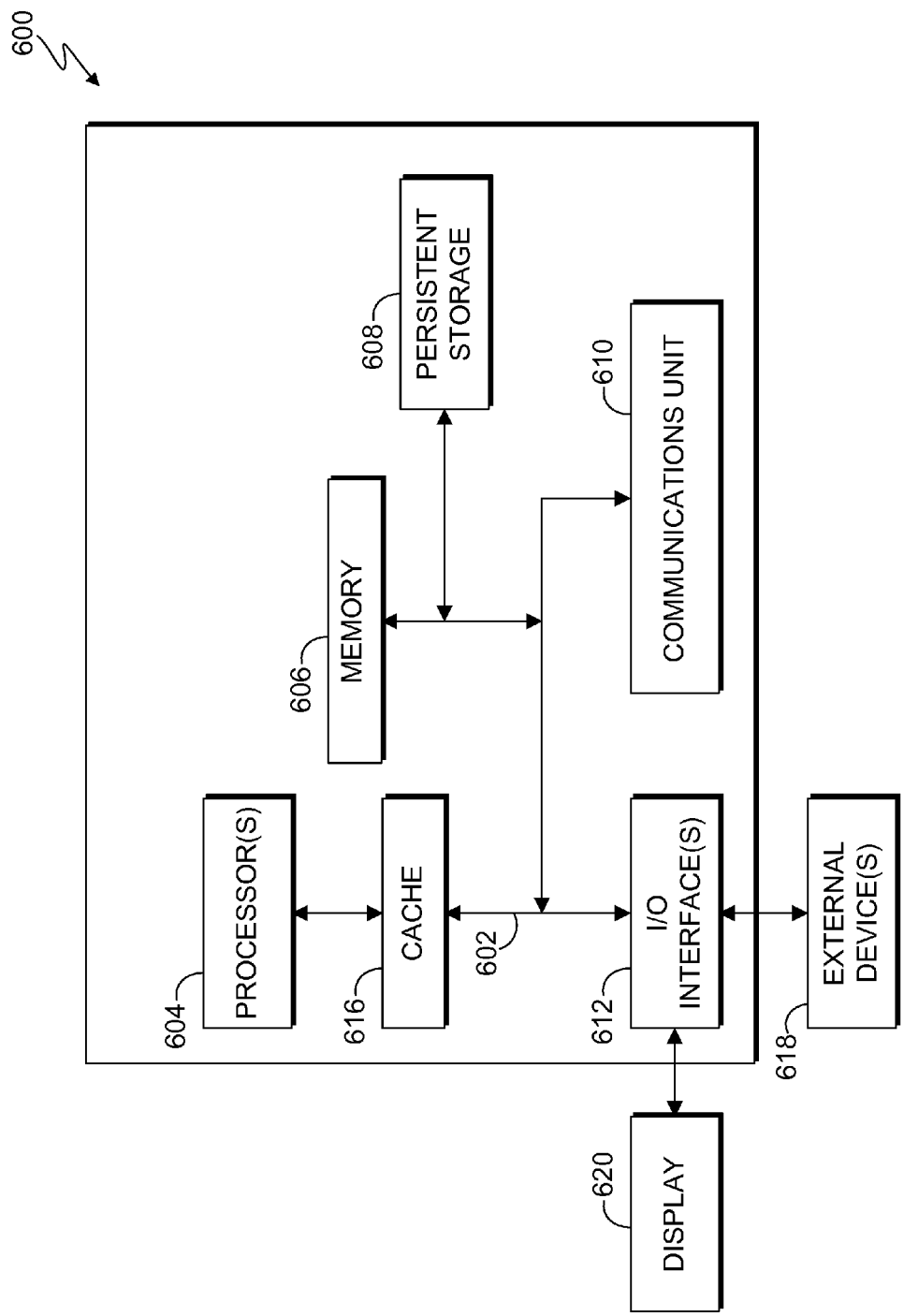
FIG. 6 depicts a block diagram of internal and external components of a computing device, in accordance with an illustrative embodiment of the present invention.

FIG. 6 is a block diagram of internal and external components of a computing device, generally designated 600, which is representative of the computing systems of FIG. 1, in accordance with an embodiment of the present invention. It should be appreciated that FIG. 6 provides only an illustration of one implementation and does not imply any limitations with regard to the environments in which different embodiments may be implemented. Many modifications to the depicted environment may be made.

Computing device 600 includes communications fabric 608, which provides communications between computer processor(s) 602, memory 604, cache 606, persistent storage 610, communications unit 614, and input/output (I/O) interface(s) 612. Communications fabric 608 can be implemented with any architecture designed for passing data and/or control information between processors (such as microprocessors, communications and network processors, etc.), system memory, peripheral devices, and any other hardware components within a system. For example, communications fabric 608 can be implemented with one or more buses.

Memory 604 and persistent storage 610 are computer-readable storage media. In this embodiment, memory 604 includes random access memory (RAM). In general, memory 604 can include any suitable volatile or non-volatile computer readable storage media. Cache 606 is a fast memory that enhances the performance of processors 602 by holding recently accessed data, and data near recently accessed data, from memory 604.

Program instructions and data used to practice embodiments of the present invention may be stored in persistent storage 610 and in memory 604 for execution by one or more of the respective processors 602 via cache 606. In an embodiment, persistent storage 610 includes a magnetic hard disk drive. Alternatively, or in addition to a magnetic hard disk drive, persistent storage 610 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 610 may also be removable. For example, a removable hard drive may be used for persistent storage 610. Other examples include optical and magnetic disks, thumb drives, and smart cards that are inserted into a drive for transfer onto another computer-readable storage medium that is also part of persistent storage 610.

Communications unit 614, in these examples, provides for communications with other data processing systems or devices, including resources of a network. In these examples, communications unit 614 includes one or more network interface cards. Communications unit 614 may provide communications through the use of either or both physical and wireless communications links. Program instructions and data used to practice embodiments of the present invention may be downloaded to persistent storage 610 through communications unit 614.

I/O interface(s) 612 allows for input and output of data with other devices that may be connected to computing device 600. For example, I/O interface 612 may provide a connection to external devices 616 such as a keyboard, keypad, a touch screen, and/or some other suitable input device. External devices 616 can also include portable computer-readable storage media such as, for example, thumb drives, portable optical or magnetic disks, and memory cards. Software and data used to practice embodiments of the present invention (e.g., software and data) can be stored on such portable computer-readable storage media and can be loaded onto persistent storage 610 via I/O interface(s) 612. I/O interface(s) 612 also connect to a display 618.

Display 618 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A system for image capture enhancement, comprising:
one or more computer processors;
one or more computer readable storage media;
program instructions stored on the one or more computer readable storage media for execution by at least one of the one or more processors;
one or more infrared emitters capable of being positioned to emit infrared light on an environment space monitored by a camera capable of capturing images of the environment space;
a control system using a processor and a memory configured to provide instructions to the processor to execute control of a sequence of emissions by the one or more emitters, wherein a sequence of infrared emissions is synchronized with a frame counter of a camera; and
a processing system using a processor and a memory configured to provide instructions to the processor to execute processing of captured image frames of the camera, the processing system including:
- a frame receiving component configured to receive the captured image frames comprising a first frame captured during an emission, and a second frame, adjacent to the first frame, captured outside an emission;
- an adjacent frame processing component configured to subtract the second frame from the first frame to provide an image of a reflected infrared component;
- a background deduction component configured to remove, from the reflected infrared component, a previously obtained background image of the environment space to enhance a subject in the image; and
- a resultant image output component configured to output a resultant image.

2. The system of claim 1, further comprising:
a plan view camera configured to capture a plan view of the environment space, wherein the control system is configured to activate the plan view camera to capture a plan view image during an emission by the one or more infrared emitters.

3. The system of claim 2, wherein the processing system further comprises:
a position component configured to:
- receive a plan view captured image from a plan view camera of the environment space;
- identify a subject in the plan view captured image; and
- position the subject in two dimensions of a plan of the environment space.

4. The system of claim 3, wherein the processing system further comprises:
a recalibration component configured to recalibrate the resultant image based on a position of the subject, and a previously obtained infrared light intensity map of the environment space.

5. The system of claim 1, further comprising:
a pre-processing component configured to:
- obtain a background image of the environment space by capturing image frames during a sequence of emissions without a subject in the environment space; and
- obtain an infrared light intensity map of the environment space.

6. The system of claim 1, wherein the control system is configured to execute control of a sequence of emissions, to fire emissions from the one or more emitters in turn, to obtain multiple captured frame images having different light angles on a subject in the environment space.

7. The system of claim 6, further comprising an activating system, the activating system configured to:
- detect a subject in the environment space; and
- activate the control system.

8. The system of claim 1, wherein the system is installable for use with an existing closed circuit television (CCTV) system including one or more video cameras directed at the environment space.

9. The system of claim 1, wherein the processing system is configured to receive captured image frames from a plurality of cameras at different locations for capturing the environment space, and wherein the resultant image output component is configured to output multiple resultant images for further processing.

10. The system of claim 1, wherein the resultant image output component sends the resultant image to a photometric sampling system for further processing.

11. A computer program product for image capture enhancement, the computer program product comprising: a computer readable storage device having program instructions stored on the computer readable storage device, the program instructions executable by a processor to cause the processor to:
- activate a sequence of infrared emissions, by one or more emitters in an environment space monitored by a camera for capturing images of the environment space, wherein the sequence of infrared emissions is synchronized with a frame counter of the camera;
- receive captured image frames from the camera, wherein the captured image frames comprise a first frame captured during an emission, and a second frame, adjacent to the first frame, captured outside an emission;
- subtract the second frame from the first frame to provide an image of a reflected infrared component;
- remove, from the reflected infrared component, a previously obtained background image of the environment space to enhance a subject in the image; and
- output a resultant image.

12. The computer program product of claim 11, further comprising:
- program instructions to receive a plan view captured image from a plan view camera of the environment space, wherein the plan view captured image is captured during an emission;
- program instructions to identify a subject in the plan view captured image; and
- program instructions to position the subject in two dimensions of a plan of the environment space.

* * * * *